C. McL. DORITTY.
AXLE BEARING.
APPLICATION FILED NOV. 18, 1907.

902,058.  Patented Oct. 27, 1908.

Witnesses.  Inventor
W. J. Peppiatt  Charles McLeod Doritty
Charles Gentle  By John C. Hendry
  His Attorney.

UNITED STATES PATENT OFFICE.

CHARLES McLEOD DORITTY, OF GRIMSBY, ONTARIO, CANADA.

AXLE-BEARING.

No. 902,058.　　　　Specification of Letters Patent.　　　　Patented Oct. 27, 1908.

Application filed November 18, 1907. Serial No. 402,599.

*To all whom it may concern:*

Be it known that I, CHARLES McLEOD DORITTY, a subject of the King of Great Britain, and resident of Grimsby, in the county of Lincoln and Province of Ontario, Canada, have invented new and useful Improvements in Axle-Bearings, of which the following is a specification.

My invention relates to improvements in axles and other bearings in which there is a stationary axle, having an outer sleeve to fit into the hub of a wheel and adapted to rotate therewith as is common, and an intermediate bushing around said axle, and between the axle and the sleeve, and adapted to rotate or partially rotate with the sleeve, or to be stationary with the axle.

The objects of my invention are, first, to provide an axle with a good lubricating bearing; second, to provide means for lubricating the rotary sleeve, together with the stationary axle, and the intermediate bushing; third, to afford facilities to allow the bushing to rotate with the sleeve, or to remain stationary with the axle, or to partially rotate with the sleeve, thereby affording a long equalized double bearing which will be durable. I attain these objects by the mechanism illustrated in the accompanying drawing, in which:—

Figure 1:
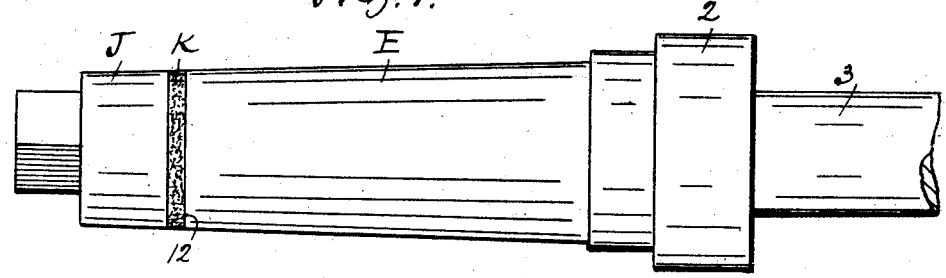
Figure 2:
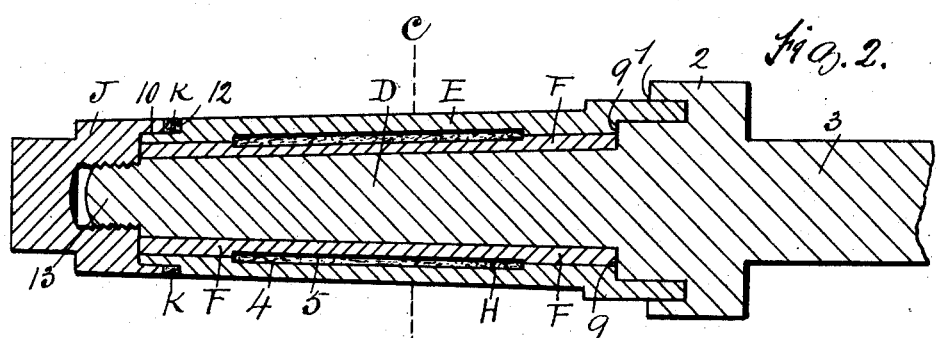
Figures 3, 4, 5:
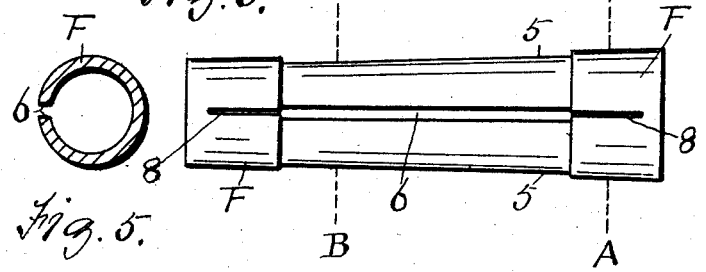
Figure 6:
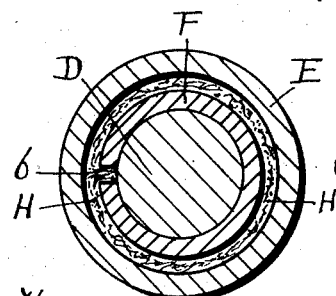

Figure 1, is an elevation of an axle bearing, the end which is intended to extend transversely under a wagon or vehicle of various kinds being shown broken. Fig. 2, is a sectional elevation of the same. Fig. 3, is a detail plan of the removed bushing. Fig. 4, is a sectional end view of the bushing, through the broken vertical line A, A, in Fig. 3, of the drawing. Fig. 5, is a sectional end view of the bushing through the broken vertical line B, B, in Fig. 3, of the drawing, and Fig. 6, is an enlarged end elevation of the axle bearing through the broken vertical line C, C, in Fig. 2, of the drawing.

Similar letters refer to similar parts throughout the several views.

In the drawing D, is a stationary tapered axle, having an enlarged part 2; and the broken end part 3 is intended to extend transversely under a wagon, or vehicle to the other side, and terminate in a similar manner, as is common.

E, is the tapered sleeve the larger end of which fits into an annular recess 1, in the enlarged part 2, of the stationary axle, and is adapted to rotate therein.

Around the tapered part D, of the axle, is a tapered bushing F, which fits the axle snugly and is adapted to rotate thereon, and also to rotate with the sleeve E. The sleeve has an extended annular chamber 4, and the bushing F, has an annular recess 5, opposite to said chamber. The bushing F, has a longitudinal slot 6, which extends the length of the recess, and a lubricating material, for instance, wool or wick H, is inserted in the slot 6, and extends around the bushing F, in the recess 5, and in the chamber 4, of the sleeve, to lubricate the sleeve, the bushing and the axle, when saturated with a lubricant.

The ends of the bushing have longitudinal grooves 8, extending from the slot 6, and communicating therewith to lubricate the end parts of the axle, the bushing and the sleeve. The larger end part of the bushing fits to, or contacts with the shoulder 9, of the axle, and the opposite and smaller end of the sleeve has a reduced part 10 which forms a shoulder 12. A retaining cover J, fits around the reduced part 10, and is screwed on the threaded shank 13, on the end of the axle.

On the reduced part 10, and between the end of the retaining cover J, and the shoulder 12, is a flexible washer K. The cover J, together with the washer K, prevents any sand or the like from entering into the sleeve, the bushing and on the axle, also the opposite end of the sleeve is sand proof. The outer reduced end part of the cover J, has sides similar to and in the form of a nut, to screw the cover to position, and is stationary with the axle D.

It will be noticed that the bushing is adapted to be either stationary with the axle, or rotate with the sleeve, as the case may be, consequently the sleeve may rotate with, or independently of the bushing.

The axle may be tapered, as shown, or the same may be cylindrical, the operation and results would be similar.

The lubricating wick H, contacts with the periphery of the axle, with the recess of the bushing, and with the chamber of the sleeve, and conduces to the lubricating of the joining parts of the sleeve and the bushing, by means of the grooves 8, in the bushing.

What I claim as my invention and desire to secure by Letters Patent, is:—

1. In an axle bearing, a stationary axle, a bushing adapted to rotate thereon and having an annular recess and a longitudinal slot communicating with said recess and axle, and having grooves in the periphery of the bushing communicating with the ends of the slot, a sleeve having a chamber, conforming to said recess, and adapted to rotate on the bushing, and independently of the bushing, and lubricating material in said slot, recess and chamber.

2. In an axle bearing, a tapered stationary axle having a threaded shank on the tapered end thereof, a tapered bushing fitting and adapted to rotate thereon and having an annular recess on a longitudinal slot communicating with said recess and axle, and having grooves in the periphery of the bushing communicating with the ends of the slot, a tapered sleeve on the bushing and adapted to rotate with and independently of the bushing, and having an annular recess on the tapered end thereof, a retaining cover screwed on the shank and abutting the ends of the bushing and the sleeve, and a flexible washer on said recess and between the cover and the shoulder of the sleeve formed by said recess.

CHARLES McLEOD DORITTY.

Witnesses:
JOHN H. HENDRY,
RICHARD BUTLER.